United States Patent
Gao et al.

(10) Patent No.: US 11,658,849 B2
(45) Date of Patent: *May 23, 2023

(54) METHODS FOR INDICATING AND DETERMINATION LARGE-SCALE CHANNEL PARAMETER, BASE STATION AND TERMINAL DEVICE

(71) Applicant: DATANG MOBILE COMMUNICATIONS EQUIPMENT CO., LTD., Beijing (CN)

(72) Inventors: Qiubin Gao, Beijing (CN); Rakesh Tamrakar, Beijing (CN); Runhua Chen, Beijing (CN); Xin Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,866

(22) Filed: Dec. 3, 2021

(65) Prior Publication Data

US 2022/0094574 A1 Mar. 24, 2022

Related U.S. Application Data

(63) Continuation of application No. 16/483,102, filed as application No. PCT/CN2018/075261 on Feb. 5, 2018, now Pat. No. 11,228,461.

(30) Foreign Application Priority Data

Feb. 6, 2017 (CN) .......................... 201710065797.7

(51) Int. Cl.
H04L 25/02 (2006.01)
H04B 7/0417 (2017.01)
(Continued)

(52) U.S. Cl.
CPC ....... *H04L 25/0204* (2013.01); *H04B 7/0417* (2013.01); *H04L 5/0053* (2013.01);
(Continued)

(58) Field of Classification Search
CPC ............... H04L 25/0204; H04L 5/0053; H04L 25/0224; H04L 27/2666; H04B 7/0417
See application file for complete search history.

(56) References Cited

U.S. PATENT DOCUMENTS 11,228,461 B2* 1/2022 Gao .................... H04B 7/0417
2013/0039203 A1 2/2013 Fong et al.
(Continued)

FOREIGN PATENT DOCUMENTS

CN 102754458 A 10/2012
CN 103840907 A 6/2014
(Continued)

OTHER PUBLICATIONS

Nokia, Alcatel-Lucent Shanghai Bell, "Beam Management—DCI monitoring" Agenda Item 5.1.2.2, 3GPP TSG RAN WG1 NR Ad-Hoc Meeting, R1-1701089, Jan. 16-20, 2017, Spokane, USA.
(Continued)

*Primary Examiner* — Siming Liu
(74) *Attorney, Agent, or Firm* — Harness, Dickey & Pierce, P.L.C.

(57) ABSTRACT

The present disclosure provides an indication method, including: determining first transmission resources related to a transmission channel for a large-scale channel parameter or a group of large-scale channel parameters, and transmitting configuration information about the first transmission resources to a terminal device via first signaling, the first transmission resources being transmission resources for K downlink reference signals, K being a positive integer; and selecting second transmission resources from the first trans- (Continued)

mission resources in accordance with a transmission parameter used by the transmission channel, and transmitting indication information about the second transmission resources to the terminal device via second signaling, the second transmission resources being transmission resources for L downlink reference signals, L being a positive integer, and K being greater than or equal to L.

20 Claims, 6 Drawing Sheets

(51) Int. Cl.

| | | |
|---|---|---|
| *H04L 5/00* | (2006.01) | |
| *H04L 27/26* | (2006.01) | |
| *H04W 16/28* | (2009.01) | |
| *H04W 24/10* | (2009.01) | |
| *H04W 72/23* | (2023.01) | |

(52) U.S. Cl.
CPC ...... *H04L 25/0224* (2013.01); *H04L 27/2666* (2013.01); *H04W 16/28* (2013.01); *H04W 24/10* (2013.01); *H04W 72/23* (2023.01)

(56) References Cited

U.S. PATENT DOCUMENTS

| | | |
|---|---|---|
| 2013/0279437 A1 | 10/2013 | Ng et al. |
| 2015/0201369 A1 | 7/2015 | Ng et al. |
| 2015/0207600 A1 | 7/2015 | Park et al. |
| 2015/0289155 A1 | 10/2015 | Gao |

FOREIGN PATENT DOCUMENTS

| | | |
|---|---|---|
| CN | 105471559 A | 4/2016 |
| JP | 2015515219 A | 5/2015 |

OTHER PUBLICATIONS

ZTE, ZTE Microelectronics, "Beam related indication for DL and UL beam management", Agenda item 5.1.2.2, 3GPP TSG RAN WG1 NR Ad-Hoc Meeting, R1-1700123, Jan. 16-20, 2017, Spokane, USA.
ZTE, ZTE Microelectronics, "UE reporting for beam management", Agenda Item 5.1.2.2, 3GPP TSG RAN WG1 NR Ad-Hoc Meeting, R1-1700124, Jan. 16-20, 2017, Spokane, USA.
ZTE, ZTE Microelectronics, "On CSI-RS for beam management", Agenda item 5.1.2.3.1, 3GPP TSG RAN WG1 NR Ad-Hoc Meeting, R1-1700134, Jan. 16-20, 2017, Spokane, USA.
Korean Office Action dated Jan. 1, 2021 for Application No. KR 10-2019-7024524.
Japanese Office Action dated Jul. 14, 2020 for JP Patent Application No. 2019-542398.
Extended European Search Report dated Dec. 18, 2019 for Application No. EP 18748276.5.
Written Opinion and International Search Report dated Aug. 6, 2019 for Application No. PCT/CN2018/075261.

\* cited by examiner

METHODS FOR INDICATING AND DETERMINATION LARGE-SCALE CHANNEL PARAMETER, BASE STATION AND TERMINAL DEVICE

CROSS-REFERENCE TO RELATED APPLICATION

The present application claims the benefit of and is a continuation application of U.S. patent application Ser. No. 16/483,102 filed on Aug. 2, 2019 which is the U.S. national phase of PCT Application PCT/CN2018/075261 filed on Feb. 5, 2018, which claims a priority of Chinese patent application No. 201710065797.7 filed on Feb. 6, 2017, each of which are incorporated herein by reference in their entirety.

TECHNICAL FIELD

The present disclosure relates to the field of communication application, in particular to methods for indicating and determining a large-scale channel parameter, a base station and a terminal device.

BACKGROUND

Multiple-Input Multiple-Output (MIMO) technique plays an important role in improving a peak rate and a system spectrum utilization rate, so such a wireless access technology standard as Long Term Evolution (LTE) or LTE-Advanced (LTE-A) is established on the basis of MIMO+ Orthogonal Frequency Division Multiplexing (OFDM). For the MIMO technique, its performance gain is derived from a spatial freedom degree capable of being acquired by a multi-antenna system, so the most important development direction of the standardization of the MIMO technology lies in the extension of dimensions.

An LTE Release 8 (Rel-8) system may support the MIMO transmission through at most four layers. An LTE Rel-9 system focuses on the enhancement of a Multi-User MIMO (MU-MIMO) technique, and it may support the MU-MIMO transmission through at most four downlink data layers in a Transmission Mode (TM)-8. In an LTE Rel-10 system, eight antenna ports may be supported, so as to improve a spatial resolution of Channel State Information (CSI) and extend a transmission capability of Single-User MIMO (SU-MIMO) to at most eight data layers. In Rel-13 and Rel-14 systems, a Full Dimension-MIMO (FD-MIMO) technique has been introduced so as to support 32 antenna ports, thereby to achieve a beamforming operation in horizontal and vertical dimensions (full-dimension).

In order to further improve the MIMO technology, a massive antenna technique has been introduced into a mobile communication system. For a base station, a massive, full-digital antenna includes up to 128, 256 or 512 antenna elements, and up to 128, 256 or 512 transceivers, and each antenna element is connected to one transceiver. Through the transmission of a pilot signal through up to 128, 256 or 512 antenna ports, it is able for a User Equipment (UE) to measure the CSI and transmit a feedback message. The UE may also be configured with an antenna array including up to 32 or 64 antenna elements. Through beamforming operations at the base station and the UE, it is able to acquire a huge beamforming gain, thereby to prevent the occurrence of signal attenuation caused by path losses. Especially for communication at a high frequency band, e.g., at a frequency of 30 GHz, a radio signal has a very limited coverage range due to the path losses. Through the massive antenna technique, it is able to extend the coverage range of the radio signal to an applicable range.

For a full digital antenna array, each antenna element is provided with an individual transceiver, so a size of a resultant device as well as the cost and power consumption thereof may increase significantly. Especially for an analog-to-digital converter (ADC) and a digital-to-analog converter (DAC) of the transceiver, it is merely able to decrease the power consumption and increase the performance in a limited manner. In order to reduce the size, the cost and the power consumption of the device, an analog beamforming-based scheme has been proposed. In order to further improve the analog beamforming performance, digital-analog hybrid beamforming transmission/reception architecture has been proposed. For the hybrid beamforming architecture, a balance has been made between the digital beamforming flexibility and the low analog beamforming complexity.

For both the analog beamforming and the digital-analog hybrid beamforming, it is necessary to adjust a an analog beamforming weight value at the transmitting end and the receiving end, so as to enable a resultant beam to be directed to an opposite end. However, in the related art, before the data transmission, it is difficult for the receiver to determine a large-scale channel parameter related to downlink reception, e.g., a space parameter, and it is impossible to set appropriate reception beams, so reception reliability of the terminal device is adversely affected.

SUMMARY

An object of the present disclosure is to provide methods for indicating and determining a large-scale channel parameter, a base station and a terminal device, so as to solve the problem in the related art where it is impossible for a receiving end to determine the large-scale channel parameter related to downlink reception.

In one aspect, the present disclosure provides in some embodiments a method for indicating a large-scale channel parameter, including: determining first transmission resources related to a transmission channel for a large-scale channel parameter or a group of large-scale channel parameters, and transmitting configuration information about the first transmission resources to a terminal device via first signaling, the first transmission resources being transmission resources for K downlink reference signals, K being a positive integer; and selecting second transmission resources from the first transmission resources in accordance with a transmission parameter used by the transmission channel, and transmitting indication information about the second transmission resources to the terminal device via second signaling, the second transmission resources being transmission resources for L downlink reference signals, L being a positive integer, and K being greater than or equal to L.

In some possible embodiments of the present disclosure, the indication information includes information about indexes of the second transmission resources in the first transmission resources.

In some possible embodiments of the present disclosure, the configuration information includes group information acquired after the first transmission resources are grouped in accordance with a predetermined grouping standard, and the predetermined grouping standard includes grouping the transmission resources for the downlink reference signals with a same large-scale channel parameter into one group, or grouping the transmission resources received via a same reception beam into one group, or grouping the transmission resources having a same channel transmission requirement into one group.

In some possible embodiments of the present disclosure, prior to determining the first transmission resources related to the transmission channel for the large-scale channel parameter or the group of large-scale channel parameters, the method further includes configuring third transmission resources for the terminal device, and transmitting configuration information about the third transmission resources to the terminal device via third signaling. The third transmission resources are transmission resources for N downlink reference signals, where N is greater than or equal to K.

In some possible embodiments of the present disclosure, the determining the first transmission resources related to the transmission channel for the large-scale channel parameter or the group of large-scale channel parameters includes determining the first transmission resources from the third transmission resources.

In some possible embodiments of the present disclosure, the determining the first transmission resources from the third transmission resources includes: acquiring measurement results of the third transmission resources measured by the terminal device or a base station itself in accordance with a predetermined quality index; and determining the first transmission resources from the third transmission resources in accordance with the measurement results.

In some possible embodiments of the present disclosure, the determining the first transmission resources from the third transmission resources in accordance with the measurement results includes: ranking the measurement results of the third transmission resources in a descending order to acquire a rank list; and determining transmission resources for the downlink reference signals corresponding to previous K measurement results in the rank list as the first transmission resources.

In some possible embodiments of the present disclosure, the determining the first transmission resources from the third transmission resources in accordance with the measurement results includes: determining a first transmission beam used by a transmission resource for an optimal downlink reference signal in accordance with the measurement results; determining K second transmission beams adjacent to the first transmission beam, a difference between a spatial directional angle of each second transmission beam and a spatial directional angle of the first transmission beam being within a predetermined range; and determining transmission resources for K downlink reference signals corresponding to the K second transmission beams as the first transmission resources.

In some possible embodiments of the present disclosure, the determining the first transmission resources related to the transmission channel for the large-scale channel parameter or the group of large-scale channel parameters includes processing transmission resources for the downlink reference signals in accordance with the third transmission resources, so as to acquire the first transmission resources and the configuration information about the first transmission resources. The configuration information includes large-scale channel parameter indication information indicating relevant information about an antenna port for each transmission resource of the first transmission resources and an antenna port for one or more transmission resources of the third transmission resources with respect to the large-scale channel parameter or the group of large-scale channel parameters.

In some possible embodiments of the present disclosure, the selecting the second transmission resources from the first transmission resources in accordance with the transmission parameter used by the transmission channel includes selecting transmission resources identical to or related to the transmission parameter used by the transmission channel from the first transmission resources as the second transmission resources.

In some possible embodiments of the present disclosure, the selecting the transmission resources identical to or related to the transmission parameter used by the transmission channel from the first transmission resources as the second transmission resources includes selecting transmission resources using a same transmission beam as the transmission channel from the first transmission resources as the second transmission resources.

In some possible embodiments of the present disclosure, the selecting the transmission resources related to the transmission parameter used by the transmission channel from the first transmission resources as the second transmission resources includes determining relevant transmission beams which belong to a same beam group as the transmission beam used by the transmission channel, and selecting transmission resources transmitted via the relevant transmission beams from the first transmission resources as the second transmission resources. A plurality of transmission beams whose spatial directional angles are within a predetermined range or a plurality of transmission beams received via a same reception beam belong to the same beam group.

In some possible embodiments of the present disclosure, the first signaling is signaling from a Media Access Control (MAC) Control Element (CE), and the second signaling is Downlink Control Information (DCI).

In some possible embodiments of the present disclosure, the large-scale channel parameter includes space parameter, delay spread, average delay, Doppler frequency offset, Doppler spread or average gain. The group of large-scale channel parameters includes at least two of space parameter, delay spread, average delay, Doppler frequency offset, Doppler spread and average gain.

In another aspect, the present disclosure provides in some embodiments a method for determining a large-scale channel parameter, including: acquiring configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer; acquiring indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and determining the large-scale channel parameter of the transmission channel in accordance with the indication information and the configuration information about the first transmission resources.

In some possible embodiments of the present disclosure, subsequent to determining the large-scale channel parameter of the transmission channel in accordance with the indication information and the configuration information about the first transmission resources, the method further includes determining a reception beam for the transmission channel in accordance with the large-scale parameter of the transmission channel.

In some possible embodiments of the present disclosure, the determining the large-scale channel parameter of the transmission channel in accordance with the indication information and the configuration information about the first transmission resource includes: measuring the K downlink reference signals transmitted via the first transmission resources in accordance with the configuration information about the first transmission resources, so as to determine large-scale channel parameters of the K downlink reference signals transmitted via the first transmission resources; acquiring large-scale channel parameters of the L downlink reference signals in the K downlink reference signals in accordance with information about indexes of the second transmission resources in the first transmission resources and the large-scale channel parameters of the K downlink reference signals; and determining the large-scale channel parameter of the transmission channel in accordance with relevant information about the L downlink reference signals and the transmission channel with respect to the large-scale channel parameter or the group of large-scale channel parameters as well as the large-scale channel parameter of the L downlink reference signals.

In some possible embodiments of the present disclosure, the configuration information includes group information acquired after the first transmission resources are grouped in accordance with a predetermined grouping standard, and the predetermined grouping standard includes grouping the transmission resources for the downlink reference signals with a same large-scale channel parameter into one group, or grouping the transmission resources received via a same reception beam into one group, or grouping the transmission resources having a same channel transmission requirement into one group. The determining the large-scale channel parameter of the K downlink reference signals transmitted via the first transmission resources in accordance with the configuration information about the first transmission resources includes determining the large-scale channel parameter of each group of transmission resources in the first transmission resources in accordance with the group information.

In some possible embodiments of the present disclosure, prior to acquiring the configuration information about the first transmission resources transmitted by the base station via the first signaling, the method further includes: acquiring third transmission resources transmitted by the base station via the first signaling, the third transmission resources being transmission resources for N downlink reference signals, N being greater than or equal to K; and measuring the third transmission resources in accordance with a predetermined quality index to acquire measurement results, and transmitting the measurement results to the base station, so as to enable the base station to determine the first transmission resources from the third transmission resources in accordance with the measurement results.

In yet another aspect, the present disclosure provides in some embodiments a base station, including: a first processing module configured to determine first transmission resources related to a transmission channel for a large-scale channel parameter or a group of large-scale channel parameters, and transmit configuration information about the first transmission resources to a terminal device via first signaling, the first transmission resources being transmission resources for K downlink reference signals, K being a positive integer; and a second processing module configured to select second transmission resources from the first transmission resources in accordance with a transmission parameter used by the transmission channel, and transmit indication information about the second transmission resources to the terminal device via second signaling, the second transmission resources being transmission resources for L downlink reference signals, L being a positive integer, and K being greater than or equal to L.

In some possible embodiments of the present disclosure, the indication information includes information about indexes of the second transmission resources in the first transmission resources.

In some possible embodiments of the present disclosure, the configuration information includes group information acquired after the first transmission resources are grouped in accordance with a predetermined grouping standard, and the predetermined grouping standard includes grouping the transmission resources for the downlink reference signals with a same large-scale channel parameter into one group, or grouping the transmission resources received via a same reception beam into one group, or grouping the transmission resources having a same channel transmission requirement into one group.

In some possible embodiments of the present disclosure, the base station further includes a configuration module configured to configure third transmission resources for the terminal device, and transmit configuration information about the third transmission resources to the terminal device via third signaling. The third transmission resources are transmission resources for N downlink reference signals, where N is greater than or equal to K.

In some possible embodiments of the present disclosure, the first processing module is further configured to determine the first transmission resources from the third transmission resources.

In some possible embodiments of the present disclosure, the first processing module includes: a first acquisition sub-module configured to acquire measurement results of the third transmission resources measured by the terminal device or the base station itself in accordance with a predetermined quality index; and a first determination sub-module configured to determine the first transmission resources from the third transmission resources in accordance with the measurement results.

In some possible embodiments of the present disclosure, the first determination sub-module includes: a ranking unit configured to rank the measurement results of the third transmission resources in a descending order to acquire a rank list; and a first determination unit configured to determine transmission resources for the downlink reference signals corresponding to previous K measurement results in the rank list as the first transmission resources.

In some possible embodiments of the present disclosure, the first determination sub-module includes: a second determination unit configured to determine a first transmission beam used by a transmission resource for an optimal downlink reference signal in accordance with the measurement results; a third determination unit configured to determine K second transmission beams adjacent to the first transmission beam, a difference between a spatial directional angle of each second transmission beam and a spatial directional angle of the first transmission beam being within a predetermined range; and a fourth determination unit configured to determine transmission resources for K downlink reference signals corresponding to the K second transmission beams as the first transmission resources.

In some possible embodiments of the present disclosure, the first processing module is further configured to process transmission resources for the downlink reference signals through an MAC CE in accordance with the third transmission resources, so as to acquire the first transmission resources and the configuration information about the first transmission resources. The configuration information includes large-scale channel parameter indication information indicating relevant information about an antenna port for each transmission resource of the first transmission resources and an antenna port for one or more transmission resources of the third transmission resources with respect to the large-scale channel parameter or the group of large-scale channel parameters.

In some possible embodiments of the present disclosure, the second processing module is further configured to select transmission resources identical to or related to the transmission parameter used by the transmission channel from the first transmission resources as the second transmission resources.

In some possible embodiments of the present disclosure, the second processing module includes a first selection sub-module configured to select transmission resources using a same transmission beam as the transmission channel from the first transmission resources as the second transmission resources.

In some possible embodiments of the present disclosure, the second processing module includes a second selection sub-module configured to determine relevant transmission beams which belong to a same beam group as the transmission beam used by the transmission channel, and select transmission resources transmitted via the relevant transmission beams from the first transmission resources as the second transmission resources. A plurality of transmission beams whose spatial directional angles are within a predetermined range or a plurality of transmission beams received via a same reception beam belong to the same beam group.

In some possible embodiments of the present disclosure, the first signaling is signaling from the MAC CE, and the second signaling is DCI.

In some possible embodiments of the present disclosure, the large-scale channel parameter includes space parameter, delay spread, average delay, Doppler frequency offset, Doppler spread or average gain. The group of large-scale channel parameters includes at least two of space parameter, delay spread, average delay, Doppler frequency offset, Doppler spread and average gain.

In still yet another aspect, the present disclosure provides in some embodiments a terminal device, including: a first acquisition module configured to acquire configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer; a second acquisition module configured to acquire indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and a first determination module configured to determine the large-scale channel parameter of the transmission channel in accordance with the indication information and the configuration information about the first transmission resources.

In some possible embodiments of the present disclosure, the terminal device further includes a second determination module configured to determine a reception beam for the transmission channel in accordance with the large-scale parameter of the transmission channel.

In some possible embodiments of the present disclosure, the first determination module includes: a second determination sub-module configured to measure the K downlink reference signals transmitted via the first transmission resources in accordance with the configuration information about the first transmission resources, so as to determine large-scale channel parameters of the K downlink reference signals transmitted via the first transmission resources; a second acquisition sub-module configured to acquire large-scale channel parameters of the L downlink reference signals in the K downlink reference signals in accordance with information about indexes of the second transmission resources in the first transmission resources and the large-scale channel parameters of the K downlink reference signals; and a third determination sub-module configured to determine the large-scale channel parameter of the transmission channel in accordance with relevant information about the L downlink reference signals and the transmission channel with respect to the large-scale channel parameter or the group of large-scale channel parameters as well as the large-scale channel parameter of the L downlink reference signals.

In some possible embodiments of the present disclosure, the configuration information includes group information acquired after the first transmission resources are grouped in accordance with a predetermined grouping standard, and the predetermined grouping standard includes grouping the transmission resources for the downlink reference signals with a same large-scale channel parameter into one group, or grouping the transmission resources received via a same reception beam into one group, or grouping the transmission resources having a same channel transmission requirement into one group. The first determination module is further configured to determine the large-scale channel parameter of each group of transmission resources in the first transmission resources in accordance with the group information.

In some possible embodiments of the present disclosure, the terminal device further includes: a third acquisition module configured to acquire third transmission resources transmitted by the base station via the first signaling, the third transmission resources being transmission resources for N downlink reference signals, N being greater than or equal to K; and a measurement module configured to measure the third transmission resources in accordance with a predetermined quality index to acquire measurement results, and transmit the measurement results to the base station, so as to enable the base station to determine the first transmission resources from the third transmission resources in accordance with the measurement results.

In still yet another aspect, the present disclosure provides in some embodiments a network side device, including a processor, a memory, and a computer program stored in the memory and executed by the processor. The processor is configured to execute the computer program so as to implement the above-mentioned method for indicating a large-scale channel parameter.

In still yet another aspect, the present disclosure provides in some embodiments a terminal side device, including a processor, a memory, and a computer program stored in the memory and executed by the processor. The processor is configured to execute the computer program so as to implement the above-mentioned method for determining a large-scale channel parameter.

In still yet another aspect, the present disclosure provides in some embodiments a computer-readable storage medium storing therein a computer program. The computer program is executed by a processor so as to implement the above-mentioned method for indicating a large-scale channel parameter.

In still yet another aspect, the present disclosure provides in some embodiments a computer-readable storage medium storing therein a computer program. The computer program is executed by a processor so as to implement the above-mentioned method for determining a large-scale channel parameter.

The present disclosure has the following beneficial effects. The base station may determine the first transmission resources related to the transmission channel for the large-scale channel parameter of the group of large-scale channel parameters and transmit the configuration information about the first transmission resources to the terminal device via the first signaling, and the first transmission resources may be transmission resources for the K downlink reference signals. Then, the base station may select the second transmission resources from the first transmission resources in accordance with a transmission parameter used by the transmission channel and transmit the indication information about the second transmission resources to the terminal device via the second signaling, and the second transmission resources may be transmission resources for the L downlink reference signals. As a result, it is able for the terminal device to determine the large-scale channel parameter of the transmission channel in accordance with the indication information and the configuration information about the first transmission resources, and determine the corresponding reception beam in accordance with the large-scale channel parameter of the transmission channel, thereby to improve the reception reliability of the terminal device.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

An object of the present disclosure is to provide methods for indicating and determining a large-scale channel parameter, a base station and a terminal device, so as to solve the problem in the related art where it is impossible for a receiving end to determine the large-scale channel parameter related to downlink reception.

First Embodiment

Figure 1:
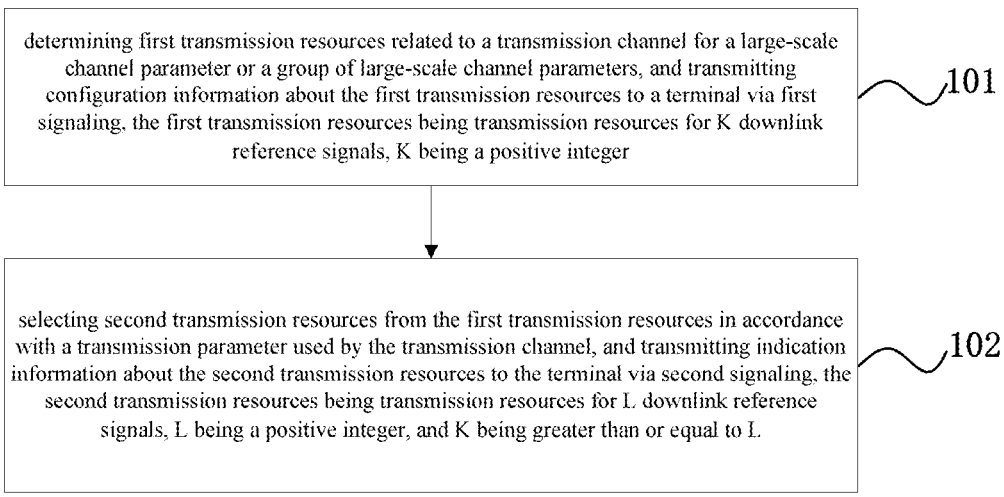
FIG. 1 is a flow chart of a method for indicating a large-scale channel parameter according to some embodiments of the present disclosure.

As shown in FIG. 1, the present disclosure provides in this embodiment a method for indicating a large-scale channel parameter for use in a base station, which includes the following steps.

Step 101: determining first transmission resources related to a transmission channel for a large-scale channel parameter or a group of large-scale channel parameters, and transmitting configuration information about the first transmission resources to a terminal device via first signaling, the first transmission resources being transmission resources for K number of downlink reference signals, K being a positive integer.

Here, the large-scale channel parameter may include space parameter, delay spread, average delay, Doppler frequency offset, Doppler spread or average gain, and the group of large-scale channel parameters may include at least two of pace parameter, delay spread, average delay, Doppler frequency offset, Doppler spread or average gain. The first signaling may be activation signaling from an MAC CE. K may be determined in accordance with the requirement on a system overhead and a capability of the terminal device, and the first signaling may be signaling from the MAC CE.

The first transmission resources being related to the transmission channel for the large-scale channel parameter or the group of large-scale channel parameters may refer to that the first transmission resources are related to a same large-scale channel parameter of a same group of large-scale channel parameters of the transmission channel. For example, the first transmission resources may be quasi co-located (QCL) with a same space parameter of the transmission channel.

To be specific, the first transmission resources may be resources quasi co-located with the transmission channel for the large-scale channel parameter or the group of large-scale channel parameters.

The configuration information may include time-frequency resources transmitted via each antenna port for a downlink reference signal and sequence configuration information. The transmission resource for each downlink reference signal may include antenna ports for P number of downlink reference signals (P downlink reference signals), e.g., P=1, 2 or any other value. A value of P may be configured by the base station through signaling, i.e., the base station may set the value of P for the transmission resource for each downlink reference signal, and transmit the value of P to the terminal device through the configuration information about the transmission resource for the downlink reference signal. In addition, the value of P may also be a constant value, e.g., P=1 as agreed in a protocol.

The transmission resource for each downlink reference signal may be transmitted via one transmission beam, and the transmission resources for different reference signals may correspond to different transmission beams.

Here, the configuration information about the first transmission resources may be transmitted to the terminal device, so that the terminal device may determine the large-scale channel parameter of the K downlink reference signals transmitted via the first transmission resources in accordance with the configuration information.

Step 102: selecting second transmission resources from the first transmission resources in accordance with a transmission parameter used by the transmission channel, and transmitting indication information about the second transmission resources to the terminal device via second signaling, the second transmission resources being transmission resources for L number of downlink reference signals (L downlink reference signals), L being a positive integer, and K being greater than or equal to L.

Here, the indication information may include information about indexes of the second transmission resources in the first transmission resources. The second signaling may be DCI. The transmission parameter may be a transmission beam or a transmission point.

In Step 102, the indication information may be transmitted to the terminal device, so that the terminal device may acquire the large-scale channel parameter of the L downlink reference signals in the K downlink reference signals in accordance with the indication information and the large-scale channel parameter of the K downlink reference signals.

According to the method in the first embodiment of the present disclosure, the base station may determine the first transmission resources related to the transmission channel for the large-scale channel parameter of the group of large-scale channel parameters and transmit the configuration information about the first transmission resources to the terminal device via the first signaling, and the first transmission resources may be transmission resources for the K downlink reference signals. Then, the base station may select the second transmission resources from the first transmission resources in accordance with a transmission parameter used by the transmission channel and transmit the indication information about the second transmission resources to the terminal device via the second signaling, and the second transmission resources may be transmission resources for the L downlink reference signals. As a result, it is able for the terminal device to determine the large-scale channel parameter of the transmission channel in accordance with the indication information and the configuration information about the first transmission resources, and determine the corresponding reception beam in accordance with the large-scale channel parameter of the transmission channel, thereby to improve the reception reliability of the terminal device.

Second Embodiment

Figure 2:
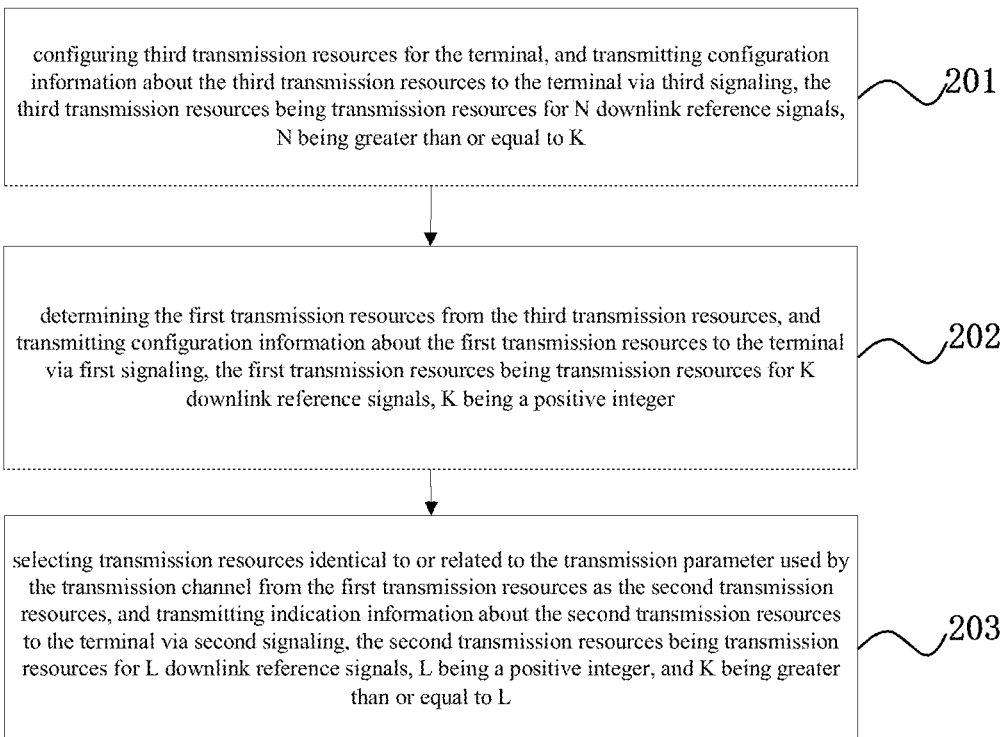
FIG. 2 is another flow chart of the method for indicating a large-scale channel parameter according to some embodiments of the present disclosure.

As shown in FIG. 2, the present disclosure further provides in this embodiment a method for indicating a large-scale channel parameter for use in a base station, which includes the following steps.

Step 201: configuring third transmission resources for the terminal device, and transmitting configuration information about the third transmission resources to the terminal device via third signaling, the third transmission resources being transmission resources for N number of downlink reference signals (N downlink reference signals), N being greater than or equal to K.

To be specific, the base station may configure for the terminal device the transmission resources for the N downlink reference signals, and each downlink reference signal may be a Channel State Information-Reference Signal (CSI-RS). The configuration information about the transmission resource for each downlink reference signal may include time-frequency resources transmitted via a group of downlink reference signal ports, and sequence configuration information about the downlink reference signals. Here, the signaling may be high-layer signaling or a broadcasting message.

When the downlink reference signal is a CSI-RS, the N number of CSI-RS resources may include all the CSI-RS transmission resources for a beam management procedure. The subsequent method may also be applicable when the CSI-RS transmission resources are replaced with CSI_RS port groups or CSI-RS ports.

Further, each CSI-RS transmission resource may include P number of CSI-RS ports, e.g., P=1, 2 or any other value. A value of P may be configured by the base station through signaling, i.e., the base station may set the value of P for each CSI-RS transmission resource, and transmit the value of P to the terminal device through the configuration information about the CSI-RS transmission resource. In addition, the value of P may also be a constant value, e.g., P=1 as agreed in a protocol.

Each CSI-RS transmission resource may be transmitted via one transmission beam, and different CSI-RS resources may correspond to different transmission beams.

In Step 201, through the configuration of the transmission resources for the N downlink reference signals, the transmission resources for the N downlink reference signals may be all the transmission resources for the downlink reference signals in the beam management procedure, so it is able for the terminal device to acquire the large-scale channel parameter of the transmission channel in a better manner.

Step 202: determining the first transmission resources from the third transmission resources, and transmitting configuration information about the first transmission resources to the terminal device via first signaling, the first transmission resources being transmission resources for K downlink reference signals, K being a positive integer.

To be specific, the determining the first transmission resources from the third transmission resources may include: acquiring measurement results of the third transmission resources measured by the terminal device or the base station itself in accordance with a predetermined quality index; and determining the first transmission resources from the third transmission resources in accordance with the measurement results.

To be specific, the measurement results of the third transmission resources may be ranked in a descending order to acquire a rank list, and transmission resources for the downlink reference signals corresponding to previous K measurement results in the rank list may be determined as the first transmission resources.

Alternatively, a first transmission beam used by a transmission resource for an optimal downlink reference signal may be determined in accordance with the measurement results, K second transmission beams adjacent to the first transmission beam may be determined with a difference between a spatial directional angle of each second transmission beam and a spatial directional angle of the first transmission beam being within a predetermined range, and then transmission resources for K downlink reference signals corresponding to the K second transmission beams may be determined as the first transmission resources.

The base station may activate the transmission resources for the K downlink reference signals in the third transmission resources, so as to track the large-scale channel parameter. In this implementation mode, it is assumed that the downlink reference signal is a CSI-RS, the large-scale channel parameter is a space parameter, and the base station determines to-be-activated CSI-RS transmission resources in accordance with a measurement result reported by the terminal device or a measurement result acquired by the base station itself. When a certain CSI-RS transmission resource has been activated, this CSI-RS transmission resource may belong to the first transmission resources, and all the activated CSI-RS transmission resources may constitute the first transmission resources. For example, the base station may configure for the terminal device N number of CSI-RS transmission resources, and a CSI-RS transmitted via each CSI-RS transmission resource may be transmitted via one beam. The terminal device may measure the N number of CSI-RS transmission resources, select Q number of CSI-RS transmission resources with the best quality, and transmit identities of the Q number of CSI-RS transmission resources and their quality indices to the base station. The quality index may be Reference Signal Received Power (RSRP), Channel State Information (CSI), etc. Upon the receipt of the information from the terminal device, the base station may determine the to-be-activated CSI-RS transmission resources in accordance with the information. For example, the base station may activate the Q number of CSI-RS transmission resources reported by the terminal device, and at this time, K=Q. Alternatively, the base station may activate the CSI-RS transmission resources transmitted via K beams adjacent to a beam for a CSI-RS transmission resource with an optical quality index, and at this time, a value of K may be determined by the base station in accordance with the requirement on a system overhead or a terminal device capability. Adjacent beams may refer to beams whose spatial directional angles are adjacent to each other, i.e., a difference between the spatial directional angles is within a predetermined range.

In addition, in the implementation mode, the base station may activate K number of CSI-RS transmission resources in N number of CSI-RS transmission resources through an MAC CE, where K is smaller than or equal to N. After signaling for activation takes effect, the terminal device may track the space parameter in accordance with the activated K number of CSI-RS transmission resources, maintain the tracking of the space parameters of the K number of CSI-RS transmission resources, and store the corresponding space parameters.

The K number of CSI-RS transmission resources may be periodic or semi-persistent. For the semi-persistent CSI-RS transmission resources, the transmission of the CSI-RS may be bound to the signaling for activation, i.e., the CSI-RS may be transmitted after the activation of the CSI-RS transmission resource, and the transmission of the CSI-RS may be stopped after the deactivation of the CSI-RS transmission resource. For the semi-persistent CSI-RS transmission resources, the transmission of the CSI-RS may also be independent of the signaling for activation, i.e., the transmission of the CSI-RS may be started and stopped under the control of any other independent signaling.

The activation and deactivation may be performed in an incremental mode. In other words, when there is currently M1 number of activated CSI-RS transmission resources and M2 number of CSI-RS transmission resources have been activated by the base station through the MAC CE, the activated CSI-RS transmission resources after the signaling for activation takes effect may include the current M1 number of activated CSI-RS transmission resources and the newly-added M2 number of CSI-RS transmission resources, i.e., totally M1+M2 number of CSI-RS transmission resources (in the case that M1 and M2 do not share any same CSI-RS transmission resources). When there is currently M1 number of activated CSI-RS transmission resources and M3 number of CSI-RS resources have been deactivated by the base station through the MAC CE, the activated CSI-RS transmission resources after the signaling for deactivation takes effect may include the current M1 number of activated CSI-RS transmission resources minus the deactivated M3 number of CSI-RS transmission resources, i.e., totally M1−M3 number of CSI-RS transmission resources.

The activation and deactivation may also be performed in an absolute mode. In other words, after the signaling for activation takes effect, the activated CSI-RS transmission resources may merely include the CSI-RS transmission resources indicated in the signaling, and when the current activated CSI-RS transmission resources are not located within a range indicated by the signaling for activation, the deactivation maybe performed automatically.

Transmission of the CSI-RS transmission resources

A) Transmission modes of a CSI-RS transmission resource may be different from each other before and after the CSI-RS transmission resource has been activated. For example, periods of the CSI-RS transmission resource may be different, i.e., the CSI-RS transmission resource may be transmitted using a smaller period after it has been activated. For another example, subcarrier intervals of the CSI-RS transmission resource may be different, i.e., the CSI-RS transmission resource may be transmitted at a larger subcarrier interval after it has been activated. For yet another aspect, transmission times of the CSI-RS transmission resource within one period may be different, i.e., the CSI-RS transmission resource may be transmitted more times within one period after it has been activated.

B) A transmission mode of a CSI-RS transmission resource after it has been activated may be the same as a transmission mode of the CSI-RS transmission resource before it has been activated.

Step 203: selecting transmission resources identical to or related to the transmission parameter used by the transmission channel from the first transmission resources as the second transmission resources, and transmitting indication information about the second transmission resources to the terminal device via second signaling, the second transmission resources being transmission resources for L number of downlink reference signals, L being a positive integer, and K being greater than or equal to L.

To be specific, the transmission resources identical to or related to the transmission parameter used by the transmission channel may be selected from the first transmission resources as the second transmission resources.

Further, the selecting the transmission resources identical to or related to the transmission parameter used by the transmission channel from the first transmission resources as the second transmission resources may include selecting transmission resources using a same transmission beam as the transmission channel from the first transmission resources as the second transmission resources.

Further, the selecting the transmission resources related to the transmission parameter used by the transmission channel from the first transmission resources as the second transmission resources may include determining relevant transmission beams which belong to a same beam group as the transmission beam used by the transmission channel, and selecting transmission resources transmitted via the relevant transmission beams from the first transmission resources as the second transmission resources. A plurality of transmission beams whose spatial directional angles may be within a predetermined range or a plurality of transmission beams received via a same reception beam may belong to the same beam group.

In Step 203, the base station may select the L number of CSI-RS transmission resources from the K number of transmission resources for the downlink reference signals for tracking the large-scale channel parameter (the space parameter), e.g., the CSI-RS transmission resources, and transmit the indication information about the L number of CSI-RS transmission resources to the terminal device through DCI.

The terminal device may receive the DCI from the base station and determine the L number of CSI-RS transmission resources. The terminal device may determine a space parameter of a data channel or a control channel in accordance with the space parameter acquired on the L number of CSI-RS transmission resources, so as to determine a reception beam for the data channel or the control channel.

After the DCI takes effect, the base station may transmit data or a control signal to the terminal device via a transmission beam for the data channel or the control channel. The terminal device may receive a data signal or a control signal using the determined reception beam. When the DCI is transmitted within a subframe (or slot) n, the DCI may take effect within a subframe (slot) n+l, i.e., the information indicated by the DCI may take effect within the subframe (slot) n+l. When l=0, the DCI may take effect within the subframe (slot) where the DCI is transmitted. A value of l may be a constant value agreed in a protocol, or indicated in the DCI.

The implementation of Step 203 will be described hereinafter in conjunction with the following examples.

FIRST EXAMPLE

When the base station determines that the transmission beams for transmitting the data channel or the control channel to the terminal device are beams A and B, the base station may select the CSI-RS resources transmitted via the beams A and B (marked as CSI-RS resource A and CSI-RS resource B) from the K number of CSI-RS transmission resources for tracking the space parameter, and notify the terminal device of indexes of the CSI-RS resource A and the CSI-RS resource B in the K number of CSI-RS transmission resources for tracking the space parameter through the DCI.

SECOND EXAMPLE

When the base station determines that the transmission beam for transmitting the data channel or control channel to the terminal device is a beam A, the base station may select the CSI-RS resource transmitted via the beam A (marked as CSI-RS resource A) from the K number of CSI-RS transmission resources for tracking the space parameter, and notify the terminal device of an index of the CSI-RS resource A in the K number of CSI-RS transmission resources for tracking the space parameter through the DCI.

THIRD EXAMPLE

When the base station determines that the transmission beam for transmitting the data channel or control channel to the terminal device is a beam A, the base station may select the CSI-RS resource transmitted via a beam B belonging to a same beam group as the beam A (marked as CSI-RS resource B) from the K number of CSI-RS transmission resources for tracking the space parameter, and notify the terminal device of an index of the CSI-RS resource B in the K number of CSI-RS transmission resources for tracking the space parameter through the DCI. Beam group may be grouped in accordance with spatial directional angles of the beams, e.g., the beams whose spatial directional angles are within a certain range may belong to a same beam group. In addition, the beam group may also be grouped in accordance with feedback information from the terminal device, e.g., the terminal device may determine, in accordance with a measurement result, that the beams received via a same reception beam belong to a same beam group, and transmit group information to the base station.

The reception of the data or control signal via the reception beam A may refer to performing a weighting and combination operation on signals received on a plurality of antenna elements using a beamforming weighted value corresponding to the reception beam A to acquire an output signal for the subsequent process.

Identically, the transmission of the data or control signal via the transmission beam B may refer to weighting an input signal (i.e., a signal from the control or data channel) using a beamforming weighted value corresponding to the transmission beam B and transmitting the weighted signal via a plurality of antenna elements.

According to the method for indicating the large-scale channel parameter in the second embodiment of the present disclosure, the base station may indicate the large-scale channel parameter of the transmission channel through two stages of indication information, i.e., the indication information from the MAC CE and the DCI, so as to enable the terminal device to acquire the large-scale channel parameter of the transmission channel in accordance with the two stages of indication information, determine the downlink reception beam for the transmission channel. In addition, when the large-scale channel parameter of the transmission channel is indicated through the two stages of indication information, it is able to make a tradeoff between the performance and the complexity in a better manner.

Third Embodiment

Figure 3:
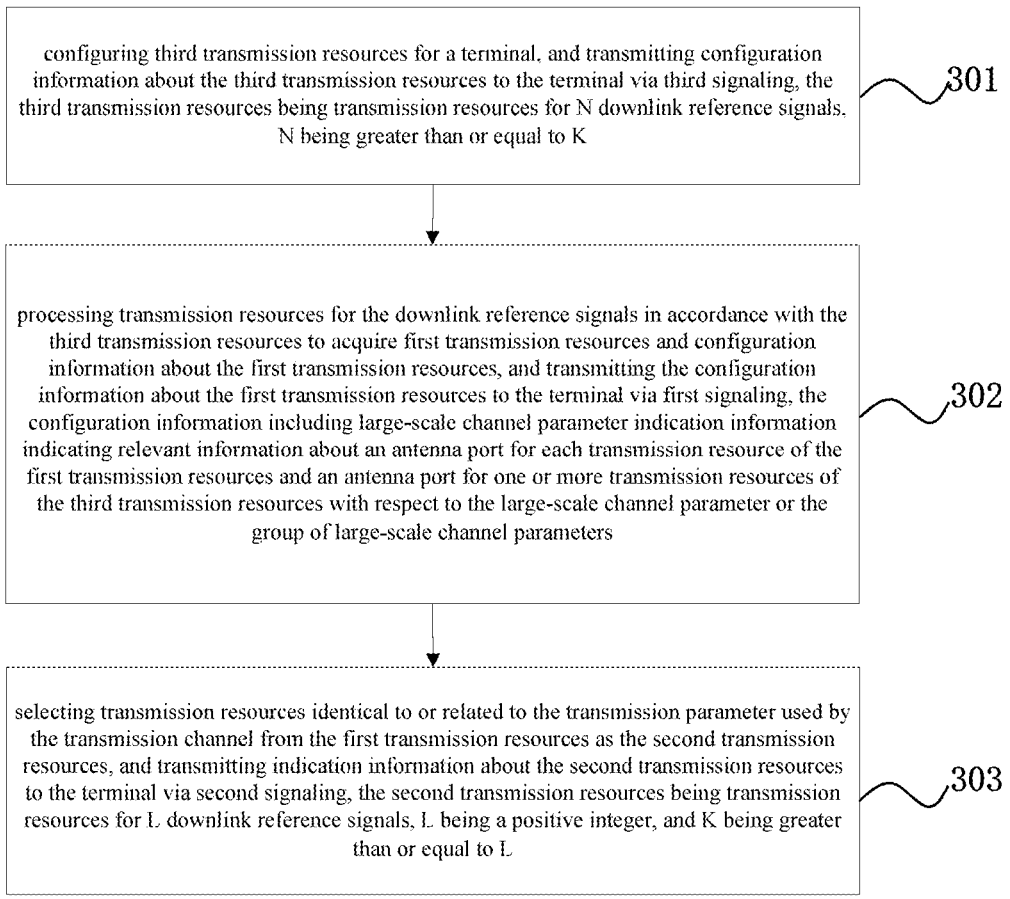
FIG. 3 is yet another flow chart of the method for indicating a large-scale channel parameter according to some embodiments of the present disclosure.

As shown in FIG. 3, the present disclosure provides in this embodiment a method for indicating a large-scale channel parameter for use in a base station, which includes the following steps.

Step 301: configuring third transmission resources for a terminal device, and transmitting configuration information about the third transmission resources to the terminal device via third signaling, the third transmission resources being transmission resources for N number of downlink reference signals, N being greater than or equal to K.

This step is the same as Step 201, and thus will not be particularly defined herein.

Step 302: processing transmission resources for the downlink reference signals in accordance with the third transmission resources to acquire first transmission resources and configuration information about the first transmission resources, and transmitting the configuration information about the first transmission resources to the terminal device via first signaling, the configuration information including large-scale channel parameter indication information indicating relevant information about an antenna port for each transmission resource of the first transmission resources and an antenna port for one or more transmission resources of the third transmission resources with respect to the large-scale channel parameter or the group of large-scale channel parameters.

To be specific, the relevant information may be QCL information.

The base station may determine transmission resources for K number of downlink reference signals, so as to track the large-scale channel parameter.

The downlink reference signal may be a CSI-RS, the large-scale channel parameter may be a space parameter, and the base station may configure the parameters, e.g., a time-frequency resource position, a period, a sequence of CSI-RSs and the quantity of ports, of the K number of CSI-RS transmission resources in an MAC CE. At this time, the K number of CSI-RS resources may be independent of the N number of CSI-RS resources in Step 301. Further, the configuration information about the K number of CSI-RS transmission resources may include indication information about the space parameter, i.e., an antenna port for each CSI-RS transmission resource may be quasi co-located with antenna ports for the N number of CSI-RS resources with respect to one or more space parameters.

After signaling from the MAC CE takes effect, the terminal device may start to track the space parameter in accordance with the K number of CSI-RS transmission resources, maintain the tracking of the space parameters of the K number of CSI-RS transmission resources, and store the corresponding space parameters.

The K number of CSI-RS transmission resources may be periodic or semi-persistent. For the semi-persistent CSI-RS resources, the transmission of the CSI-RS may be bound to the signaling from the MAC CE, i.e., the CSI-RS may be transmitted after the signaling from the MAC CE takes effect, and the transmission of the CSI-RS may be stopped after the signaling from the MAC CE fails. For the semi-persistent CSI-RS transmission resources, the transmission of the CSI-RS may also be independent of the signaling for activation, i.e., the transmission of the CSI-RS may be started and stopped under the control of any other independent signaling.

Illustratively, the configuration information may include group information acquired after the first transmission resources are grouped in accordance with a predetermined grouping standard, and the predetermined grouping standard may include grouping the transmission resources for the downlink reference signals with a same large-scale channel parameter into one group, or grouping the transmission resources received via a same reception beam into one group, or grouping the transmission resources having a same channel transmission requirement into one group.

At this time, when tracking the large-scale channel parameter, the terminal device may track the transmission resources having the same group information in a joint manner in accordance with the configuration information, so as to determine the large-scale channel parameters of the K downlink reference signals transmitted via the first transmission resources more rapidly.

The following description will be given when the downlink reference signal is a CSI-RS.

The CSI-RS transmission resources may be grouped into F number of groups, and the CSI-RS resources having a same space parameter may be grouped into a same group. The base station may transmit the group information to the terminal device through the configuration information.

In addition, the base station may also group the transmission resources in accordance with feedback information from the terminal device. For example, the terminal device may group, in accordance with a measurement result, the beams (i.e., the CSI-RS transmission resources) received via a same reception beam into one CSI-RS resource group, and transmit the group information to the base station.

In addition, the base station may also group the transmission resources in accordance with a transmission requirement of the data or control channel. For example, when the base station is about to transmit the data or control signal via two transmission beams, i.e., a transmission beam A and a transmission beam B, but the data or control signal is received by the terminal device merely via one reception beam, the base station may group a CSI-RS transmission resource corresponding to the transmission beam A and a CSI-RS transmission resource corresponding to the transmission beam B into one group. At this time, the terminal device may estimate the space parameters of the two CSI-RS transmission resources in a joint manner, so as to determine the reception beam capable of receiving the transmission beam A and the transmission beam B.

Step 303: selecting transmission resources identical to or related to the transmission parameter used by the transmission channel from the first transmission resources as the second transmission resources, and transmitting indication information about the second transmission resources to the terminal device via second signaling, the second transmission resources being transmission resources for L number of downlink reference signals, L being a positive integer, and K being greater than or equal to L.

Step 303 is the same as Step 203, and thus will not be particularly defined herein.

According to the method for indicating the large-scale channel parameter in the third embodiment of the present disclosure, the base station may indicate the large-scale channel parameter of the transmission channel through two stages of indication information, i.e., the indication information from the MAC CE and the DCI, so as to enable the terminal device to acquire the large-scale channel parameter of the transmission channel in accordance with the two stages of indication information, determine the downlink reception beam for the transmission channel. In addition, when the large-scale channel parameter of the transmission channel is indicated through the two stages of indication information, it is able to make a tradeoff between the performance and the complexity in a better manner.

Fourth Embodiment

Figure 4:
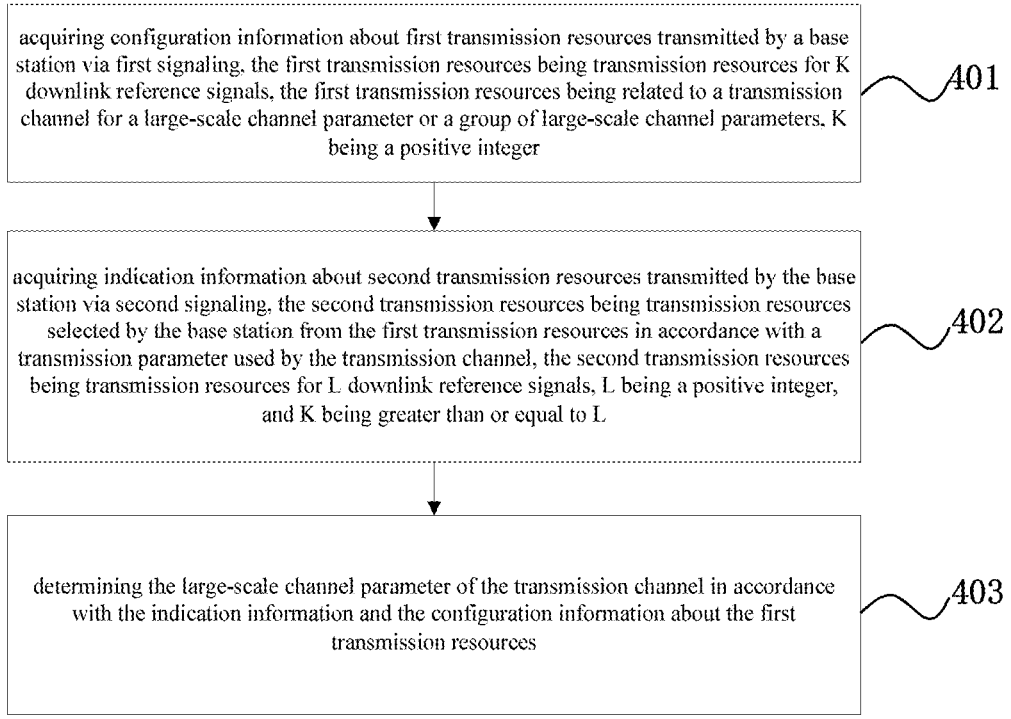
FIG. 4 is a flow chart of a method for determining a large-scale channel parameter according to some embodiments of the present disclosure.

As shown in FIG. 4, the present disclosure provides in this embodiment a method for determining a large-scale channel parameter for use in a terminal device, which includes the following steps.

Step 401: acquiring configuration information about first transmission resources transmitted by a base station via first signaling, the first transmission resources being transmission resources for K number of downlink reference signals, the first transmission resources being related to a transmission channel for a large-scale channel parameter or a group of large-scale channel parameters, K being a positive integer.

Here, the first transmission resources may be quasi co-located with the transmission channel for the large-scale channel parameter or the group of large-scale channel parameters.

The terminal device may track the large-scale channel parameter or the group of large-scale channel parameters in accordance with the K number of downlink reference signals.

The configuration information may include time-frequency resources transmitted via each antenna port for a downlink reference signal and sequence configuration information. The transmission resource for each downlink reference signal may include antenna ports for P downlink reference signals, e.g., P=1, 2 or any other value. A value of P may be configured by the base station through signaling, i.e., the base station may set the value of P for the transmission resource for each downlink reference signal, and transmit the value of P to the terminal device through the configuration information about the transmission resource for the downlink reference signal. In addition, the value of P may also be a constant value, e.g., P=1 as agreed in a protocol.

The transmission resource for each downlink reference signal may be transmitted via one transmission beam, and the transmission resources for different reference signals may correspond to different transmission beams.

Here, the configuration information about the first transmission resources may be transmitted to the terminal device, so that the terminal device may determine the large-scale channel parameter of the K number of downlink reference signals transmitted via the first transmission resources in accordance with the configuration information.

Step 402: acquiring indication information about second transmission resources transmitted by the base station via second signaling, the second transmission resources being transmission resources selected by the base station from the first transmission resources in accordance with a transmission parameter used by the transmission channel, the second transmission resources being transmission resources for L number of downlink reference signals, L being a positive integer, and K being greater than or equal to L.

Here, the indication information may include information about indexes of the second transmission resources in the first transmission resources. The second signaling may be DCI.

In Step 402, the indication information may be transmitted to the terminal device, so that the terminal device may acquire the large-scale channel parameter of the L number of downlink reference signals in the K number of downlink reference signals in accordance with the indication information and the large-scale channel parameter of the K number of downlink reference signals.

Step 403: determining the large-scale channel parameter of the transmission channel in accordance with the indication information and the configuration information about the first transmission resources.

In some possible embodiments of the present disclosure, Step 403 may include: measuring the K downlink reference signals transmitted via the first transmission resources in accordance with the configuration information about the first transmission resources, so as to determine large-scale channel parameters of the K downlink reference signals transmitted via the first transmission resources; acquiring large-scale channel parameters of the L downlink reference signals in the K downlink reference signals in accordance with information about indexes of the second transmission resources in the first transmission resources and the large-scale channel parameters of the K downlink reference signals; and determining the large-scale channel parameter of the transmission channel in accordance with relevant information about the L downlink reference signals and the transmission channel with respect to the large-scale channel parameter or the group of large-scale channel parameters as well as the large-scale channel parameter of the L downlink reference signals.

The relevant information about the L downlink reference signals and the transmission channel with respect to the large-scale channel parameter or the group of large-scale channel parameters may be QCL information, i.e., the L downlink reference signals may be quasi co-located with the transmission channel with respect to the large-scale channel parameter or the group of large-scale channel parameters.

When two signals are quasi co-located with each other with respect to one space parameter (space arrival angle average, space arrival angle spread, space departure angle average, or space departure angle spread), the space parameter of one signal may be derived from the space parameter of the other signal (e.g., the space parameters of the two signals may be the same). When a transmitter end has notified a receiving end of the fact that a Demodulation Reference Signal (DMRS) for the data or control channel is quasi co-located with a reference signal port or reference signal ports with respect to the space parameter, the receiving end may estimate the space parameter in accordance with the reference signal port or reference signal ports, determine the reception beams, and receive the data or control signal via the reception beams.

Subsequent to Step 403, the method may further include determining a reception beam for the transmission channel in accordance with the large-scale parameter of the transmission channel.

Here, through determining the reception beam for the transmission channel in accordance with the large-scale parameter of the transmission channel, it is able to improve the reception reliability of the terminal device.

Illustratively, the configuration information may include group information acquired after the first transmission resources are grouped in accordance with a predetermined grouping standard, and the predetermined grouping standard may include grouping the transmission resources for the downlink reference signals with a same large-scale channel parameter into one group, or grouping the transmission resources received via a same reception beam into one group, or grouping the transmission resources having a same channel transmission requirement into one group.

At this time, Step 403 may include determining the large-scale channel parameter of each group of transmission resources in the first transmission resources in accordance with the group information.

At this time, when tracking the large-scale channel parameter, the terminal device may track the transmission resources having the same group information in a joint manner in accordance with the configuration information, so as to determine the large-scale channel parameters of the K downlink reference signals transmitted via the first transmission resources more rapidly.

Prior to Step 401, the method may further include: acquiring third transmission resources transmitted by the base station via the first signaling, the third transmission resources being transmission resources for N downlink reference signals, N being greater than or equal to K; and measuring the third transmission resources in accordance with a predetermined quality index to acquire measurement results, and transmitting the measurement results to the base station, so as to enable the base station to determine the first transmission resources from the third transmission resources in accordance with the measurement results.

Here, the downlink reference signal may be a CSI-RS, and the large-scale channel parameter may be a space parameter. The terminal device may measure the N number of CSI-RS transmission resources, select Q number of CSI-RS transmission resources with the best quality, and transmit identities of the Q number of CSI-RS transmission resources and their quality indices to the base station. The quality index may be RSRP, CSI, etc. Upon the receipt of the information from the terminal device, the base station may determine to-be-activated CSI-RS transmission resources in accordance with the information. For example, the base station may activate the Q number of CSI-RS transmission resources reported by the terminal device, and at this time, K=Q. Alternatively, the base station may activate the CSI-RS transmission resources transmitted via K beams adjacent to a beam for a CSI-RS transmission resource with an optical quality index, and at this time, a value of K may be determined by the base station in accordance with the requirement on a system overhead or a terminal device capability. Adjacent beams may refer to beams whose spatial directional angles are adjacent to each other.

According to the method for determining the large-scale channel parameter in the fourth embodiment of the present disclosure, the terminal device may acquire the configuration information about the first transmission resources transmitted via the first signaling, the first transmission resources may be transmission resources for K downlink reference signals, the first transmission resources may be related to the transmission channel for the large-scale channel parameter or the group of large-scale channel parameters, and K may be a positive integer. Next, the terminal device may acquire the indication information about the second transmission resources transmitted by the base station via the second signaling, the second transmission resources may be transmission resources selected by the base station from the first transmission resources in accordance with the transmission parameter used by the transmission channel, the second transmission resources may be transmission resources for the L downlink reference signals, L may be a positive integer, and K may be greater than or equal to L. Then, the terminal device may determine the large-scale channel parameter of the transmission channel in accordance with the indication information and the configuration information about the first transmission resources. As a result, it is able for the terminal device to determine the corresponding reception beam in accordance with the large-scale channel parameter of the transmission channel, thereby to improve the reception reliability of the terminal device.

Fifth Embodiment

Figure 5:
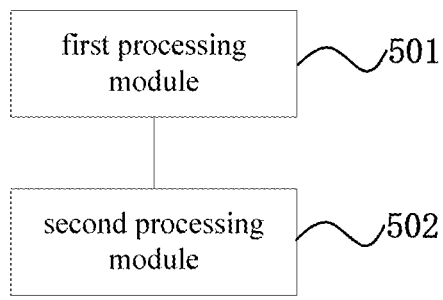
FIG. 5 is a block diagram of a base station according to some embodiments of the present disclosure.

As shown in FIG. 5, the present disclosure further provides in this embodiment a base station, which includes: a first processing module 501 configured to determine first transmission resources related to a transmission channel for a large-scale channel parameter or a group of large-scale channel parameters, and transmit configuration information about the first transmission resources to a terminal device via first signaling, the first transmission resources being transmission resources for K downlink reference signals, K being a positive integer; and a second processing module 502 configured to select second transmission resources from the first transmission resources in accordance with a transmission parameter used by the transmission channel, and transmit indication information about the second transmission resources to the terminal device via second signaling, the second transmission resources being transmission resources for L downlink reference signals, L being a positive integer, and K being greater than or equal to L.

In some possible embodiments of the present disclosure, the indication information may include information about indexes of the second transmission resources in the first transmission resources.

In some possible embodiments of the present disclosure, the configuration information may include group information acquired after the first transmission resources are grouped in accordance with a predetermined grouping standard, and the predetermined grouping standard may include grouping the transmission resources for the downlink reference signals with a same large-scale channel parameter into one group, or grouping the transmission resources received via a same reception beam into one group, or grouping the transmission resources having a same channel transmission requirement into one group.

Figure 6:
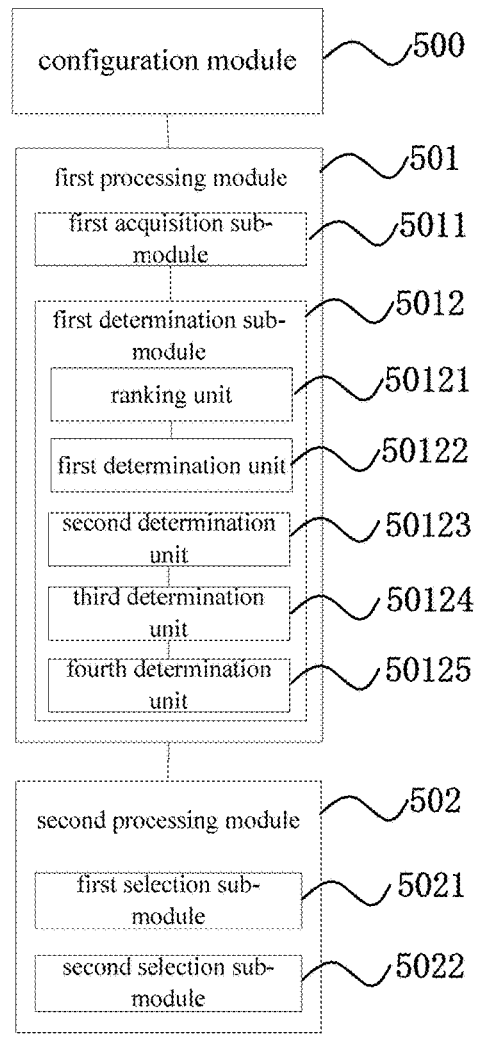
FIG. 6 is another block diagram of the base station according to some embodiments of the present disclosure.

As shown in FIG. 6, the base station may further include a configuration module 500 configured to configure third transmission resources for the terminal device, and transmit configuration information about the third transmission resources to the terminal device via third signaling. The third transmission resources may be transmission resources for N downlink reference signals, where N is greater than or equal to K.

In some possible embodiments of the present disclosure, the first processing module 501 is further configured to determine the first transmission resources from the third transmission resources.

In some possible embodiments of the present disclosure, the first processing module 501 may include: a first acquisition sub-module 5011 configured to acquire measurement results of the third transmission resources measured by the terminal device or the base station itself in accordance with a predetermined quality index; and a first determination sub-module 5012 configured to determine the first transmission resources from the third transmission resources in accordance with the measurement results.

In some possible embodiments of the present disclosure, the first determination sub-module 5012 may include: a ranking unit 50121 configured to rank the measurement results of the third transmission resources in a descending order to acquire a rank list; and a first determination unit 50122 configured to determine transmission resources for the downlink reference signals corresponding to previous K measurement results in the rank list as the first transmission resources.

In some possible embodiments of the present disclosure, the first determination sub-module 5012 may include: a second determination unit 50123 configured to determine a first transmission beam used by a transmission resource for an optimal downlink reference signal in accordance with the measurement results; a third determination unit 50124 configured to determine K second transmission beams adjacent to the first transmission beam, a difference between a spatial directional angle of each second transmission beam and a spatial directional angle of the first transmission beam being within a predetermined range; and a fourth determination unit 50125 configured to determine transmission resources for K downlink reference signals corresponding to the K second transmission beams as the first transmission resources.

In some possible embodiments of the present disclosure, the first processing module 501 is further configured to process transmission resources for the downlink reference signals through an MAC CE in accordance with the third transmission resources, so as to acquire the first transmission resources and the configuration information about the first transmission resources.

In some possible embodiments of the present disclosure, the configuration information may include large-scale channel parameter indication information indicating relevant information about an antenna port for each transmission resource of the first transmission resources and an antenna port for one or more transmission resources of the third transmission resources with respect to the large-scale channel parameter or the group of large-scale channel parameters.

In some possible embodiments of the present disclosure, the second processing module 502 is further configured to select transmission resources identical to or related to the transmission parameter used by the transmission channel from the first transmission resources as the second transmission resources.

In some possible embodiments of the present disclosure, the second processing module 502 may include a first selection sub-module 5021 configured to select transmission resources using a same transmission beam as the transmission channel from the first transmission resources as the second transmission resources.

In some possible embodiments of the present disclosure, the second processing module 502 may include a second selection sub-module 5022 configured to determine relevant transmission beams which belong to a same beam group as the transmission beam used by the transmission channel, and select transmission resources transmitted via the relevant transmission beams from the first transmission resources as the second transmission resources. A plurality of transmission beams whose spatial directional angles may be within a predetermined range or a plurality of transmission beams received via a same reception beam may belong to the same beam group.

In some possible embodiments of the present disclosure, the first signaling may be signaling from the MAC Control Element (MAC CE), and the second signaling may be DCI.

In some possible embodiments of the present disclosure, the large-scale channel parameter may include space parameter, delay spread, average delay, Doppler frequency offset, Doppler spread or average gain. The group of large-scale channel parameters may include at least two of space parameter, delay spread, average delay, Doppler frequency offset, Doppler spread and average gain.

It should be appreciated that, the base station may correspond to the methods for indicating the large-scale channel parameter, so the implementation of the base station may refer to that of the method mentioned hereinabove, with a same technical effect.

According to the base station in the fifth embodiment of the present disclosure, the base station may determine the first transmission resources related to the transmission channel for the large-scale channel parameter of the group of large-scale channel parameters and transmit the configuration information about the first transmission resources to the terminal device via the first signaling, and the first transmission resources may be transmission resources for the K downlink reference signals. Then, the base station may select the second transmission resources from the first transmission resources in accordance with a transmission parameter used by the transmission channel and transmit the indication information about the second transmission resources to the terminal device via the second signaling, and the second transmission resources may be transmission resources for the L downlink reference signals. As a result, it is able for the terminal device to determine the large-scale channel parameter of the transmission channel in accordance with the indication information and the configuration information about the first transmission resources, and determine the corresponding reception beam in accordance with the large-scale channel parameter of the transmission channel, thereby to improve the reception reliability of the terminal device.

Sixth Embodiment

Figure 7:
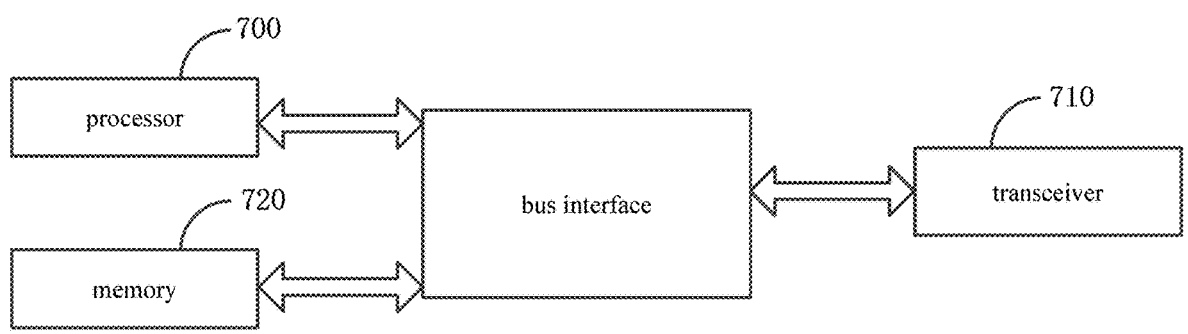
FIG. 7 is yet another block diagram of the base station according to some embodiments of the present disclosure.

As shown in FIG. 7, the present disclosure further provides in this embodiment a base station, which includes a processor 700, a memory 720 connected to the processor 700 via a bus interface, and a transceiver 700 connected to the processor 700 via the bus interface. The memory 720 is configured to store therein programs and data for the operation of the processor. Data information or pilot signals are transmitted through the transceiver 710, and an uplink control channel is received through the transceiver 710. The processor 700 is configured to call and execute the programs and data stored in the memory 720, so as to achieve the functions of the following modules: a first processing module configured to determine first transmission resources related to a transmission channel for a large-scale channel parameter or a group of large-scale channel parameters, and transmit configuration information about the first transmission resources to a terminal device via first signaling, the first transmission resources being transmission resources for K downlink reference signals, K being a positive integer; and a second processing module configured to select second transmission resources from the first transmission resources in accordance with a transmission parameter used by the transmission channel, and transmit indication information about the second transmission resources to the terminal device via second signaling, the second transmission resources being transmission resources for L downlink reference signals, L being a positive integer, and K being greater than or equal to L.

The processor 700 is further configured to read the programs stored in the memory 720, so as to: determine first transmission resources related to a transmission channel for a large-scale channel parameter or a group of large-scale channel parameters, and transmit configuration information about the first transmission resources to a terminal device via first signaling, the first transmission resources being transmission resources for K downlink reference signals, K being a positive integer; and select second transmission resources from the first transmission resources in accordance with a transmission parameter used by the transmission channel, and transmit indication information about the second transmission resources to the terminal device via second signaling, the second transmission resources being transmission resources for L downlink reference signals, L being a positive integer, and K being greater than or equal to L.

The transceiver 710 is configured to receive and transmit data under the control of the processor 700.

In FIG. 7, bus architecture may include a number of buses and bridges connected to each other, so as to connect various circuits for one or more processors 700 and one or more memories 720. In addition, as is known in the art, the bus architecture 1000 may be used to connect any other circuits, such as a circuit for a peripheral device, a circuit for a voltage stabilizer and a power management circuit, which are not particularly defined herein. The bus interface may be are provided, and the transceiver 710 may consist of a plurality of elements, e.g., a transmitter and a receiver for communication with any other devices over a transmission medium. The processor 700 may take charge of managing the bus architecture as well general processings. The memory 720 may store data therein for the operation of the processor 700.

According to the base station in the sixth embodiment of the present disclosure, the processor 700 may determine the first transmission resources related to the transmission channel for the large-scale channel parameter of the group of large-scale channel parameters and transmit the configuration information about the first transmission resources to the terminal device via the first signaling, and the first transmission resources may be transmission resources for the K downlink reference signals. Then, the base station may select the second transmission resources from the first transmission resources in accordance with a transmission parameter used by the transmission channel and transmit the indication information about the second transmission resources to the terminal device via the second signaling, and the second transmission resources may be transmission resources for the L downlink reference signals. As a result, it is able for the terminal device to determine the large-scale channel parameter of the transmission channel in accordance with the indication information and the configuration information about the first transmission resources, and determine the corresponding reception beam in accordance with the large-scale channel parameter of the transmission channel, thereby to improve the reception reliability of the terminal device.

Seventh Embodiment

Figure 8:
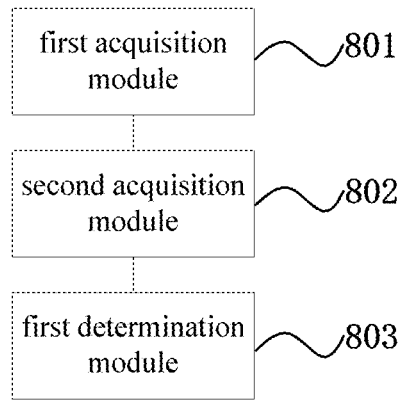
FIG. 8 is a block diagram of a terminal device according to some embodiments of the present disclosure.

As shown in FIG. 8, the present disclosure further provides in this embodiment a terminal device, which includes: a first acquisition module 801 configured to acquire configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer; a second acquisition module 802 configured to acquire indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and a first determination module 803 configured to determine the large-scale channel parameter of the transmission channel in accordance with the indication information and the configuration information about the first transmission resources.

Figure 9:
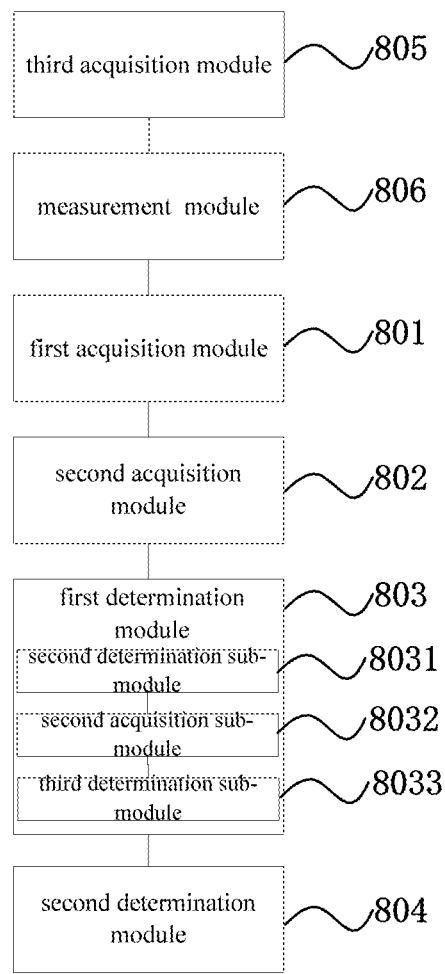
FIG. 9 is another block diagram of the terminal device according to some embodiments of the present disclosure.

As shown in FIG. 9, the terminal device may further include a second determination module 804 configured to determine a reception beam for the transmission channel in accordance with the large-scale parameter of the transmission channel.

In some possible embodiments of the present disclosure, the first determination module 803 may include: a second determination sub-module 8031 configured to measure the K downlink reference signals transmitted via the first transmission resources in accordance with the configuration information about the first transmission resources, so as to determine large-scale channel parameters of the K downlink reference signals transmitted via the first transmission resources; a second acquisition sub-module 8032 configured to acquire large-scale channel parameters of the L downlink reference signals in the K downlink reference signals in accordance with information about indexes of the second transmission resources in the first transmission resources and the large-scale channel parameters of the K downlink reference signals; and a third determination sub-module 8033 configured to determine the large-scale channel parameter of the transmission channel in accordance with relevant information about the L downlink reference signals and the transmission channel with respect to the large-scale channel parameter or the group of large-scale channel parameters as well as the large-scale channel parameter of the L downlink reference signals.

In some possible embodiments of the present disclosure, the configuration information may include group information acquired after the first transmission resources are grouped in accordance with a predetermined grouping standard, and the predetermined grouping standard may include grouping the transmission resources for the downlink reference signals with a same large-scale channel parameter into one group, or grouping the transmission resources received via a same reception beam into one group, or grouping the transmission resources having a same channel transmission requirement into one group. The first determination module 803 is further configured to determine the large-scale channel parameter of each group of transmission resources in the first transmission resources in accordance with the group information.

The terminal device may further include: a third acquisition module 805 configured to acquire third transmission resources transmitted by the base station via the first signaling, the third transmission resources being transmission resources for N downlink reference signals, N being greater than or equal to K; and a measurement module 806 configured to measure the third transmission resources in accordance with a predetermined quality index to acquire measurement results, and transmit the measurement results to the base station, so as to enable the base station to determine the first transmission resources from the third transmission resources in accordance with the measurement results.

It should be appreciated that, the terminal device may correspond to the methods for determining the large-scale channel parameter, so the implementation of the terminal device may refer to that of the method mentioned hereinabove, with a same technical effect.

According to the terminal device in the seventh embodiment of the present disclosure, the terminal device may acquire the configuration information about the first transmission resources transmitted via the first signaling, the first transmission resources may be transmission resources for K downlink reference signals, the first transmission resources may be related to the transmission channel for the large-scale channel parameter or the group of large-scale channel parameters, and K may be a positive integer. Next, the terminal device may acquire the indication information about the second transmission resources transmitted by the base station via the second signaling, the second transmission resources may be transmission resources selected by the base station from the first transmission resources in accordance with the transmission parameter used by the transmission channel, the second transmission resources may be transmission resources for the L downlink reference signals, L may be a positive integer, and K may be greater than or equal to L. Then, the terminal device may determine the large-scale channel parameter of the transmission channel in accordance with the indication information and the configuration information about the first transmission resources. As a result, it is able for the terminal device to determine the corresponding reception beam in accordance with the large-scale channel parameter of the transmission channel, thereby to improve the reception reliability of the terminal device.

Eighth Embodiment

Figure 10:
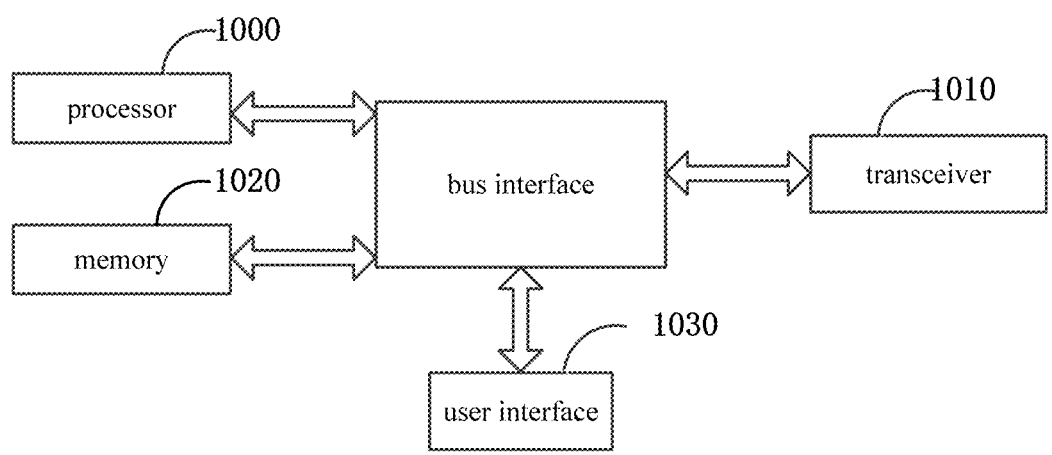
FIG. 10 is yet another block diagram of the terminal device according to some embodiments of the present disclosure.

As shown in FIG. 10, the present disclosure further provides in this embodiment a terminal device, which includes a processor 1000, a memory 1020 connected to the processor 1000 via a bus interface, and a transceiver 1010 connected to the processor via the bus interface. The memory 1020 is configured to store therein programs and data for the operation of the processor. Data information or pilot signals are transmitted through the transceiver 1010, and an uplink control channel is received through the transceiver 1010. The processor 1000 is configured to call and execute the programs and data stored in the memory 1020, so as to achieve the functions of the following modules: a first acquisition module configured to acquire configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer; a second acquisition module configured to acquire indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and a first determination module configured to determine the large-scale channel parameter of the transmission channel in accordance with the indication information and the configuration information about the first transmission resources.

The processor 1000 is configured to read the programs stored in the memory 1020, so as to: acquire configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer; acquire indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and determine the large-scale channel parameter of the transmission channel in accordance with the indication information and the configuration information about the first transmission resources.

The transceiver 1010 is configured to receive and transmit data under the control of the processor 1000.

In FIG. 10, bus architecture may include a number of buses and bridges connected to each other, so as to connect various circuits for one or more processors 1000 and one or more memories 1020. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 1010 may consist of a plurality of elements, e.g., a transmitter and a receiver for communication with any other devices over a transmission medium. With respect to different UEs, a user interface 1030 may also be provided for devices which are to be arranged inside or outside the UE, and these devices may include but not limited to a keypad, a display, a speaker, a microphone and a joystick. The processor 1000 may take charge of managing the bus architecture as well as general processings. The memory 1020 may store therein data for the operation of the processor 1000.

According to the terminal device in the eighth embodiment of the present disclosure, the terminal device may acquire the configuration information about the first transmission resources transmitted via the first signaling, the first transmission resources may be transmission resources for K downlink reference signals, the first transmission resources may be related to the transmission channel for the large-scale channel parameter or the group of large-scale channel parameters, and K may be a positive integer. Next, the terminal device may acquire the indication information about the second transmission resources transmitted by the base station via the second signaling, the second transmission resources may be transmission resources selected by the base station from the first transmission resources in accordance with the transmission parameter used by the transmission channel, the second transmission resources may be transmission resources for the L downlink reference signals, L may be a positive integer, and K may be greater than or equal to L. Then, the terminal device may determine the large-scale channel parameter of the transmission channel in accordance with the indication information and the configuration information about the first transmission resources. As a result, it is able for the terminal device to determine the corresponding reception beam in accordance with the large-scale channel parameter of the transmission channel, thereby to improve the reception reliability of the terminal device.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for determining a large-scale channel parameter, comprising:
obtaining, by the terminal side device, configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer;
obtaining, by the terminal side device, indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and determining, by the terminal side device, the large-scale channel parameter of the transmission channel in accordance with the indication information and the configuration information about the first transmission resources, wherein the terminal side device obtains third transmission resources transmitted by the base station, wherein the third transmission resources are transmission resources for N downlink reference signals, where N is greater than or equal to K;

wherein the first transmission resources are determined from the third transmission resources.

2. The method according to claim 1, wherein subsequent to determining, by the terminal side device, the large-scale channel parameter of the transmission channel in accordance with the indication information and the configuration information about the first transmission resources, the method further comprises: determining a reception beam for the transmission channel in accordance with the large-scale parameter of the transmission channel.

3. The method according to claim 1, wherein the determining, by the terminal side device, the large-scale channel parameter of the transmission channel in accordance with the indication information and the configuration information about the first transmission resource comprises: measuring the K downlink reference signals transmitted via the first transmission resources in accordance with the configuration information about the first transmission resources, determining large-scale channel parameters of the K downlink reference signals transmitted via the first transmission resources; obtaining large-scale channel parameters of the L downlink reference signals in the K downlink reference signals in accordance with information about indexes of the second transmission resources in the first transmission resources and the large-scale channel parameters of the K downlink reference signals; and determining the large-scale channel parameter of the transmission channel in accordance with relevant information about the L downlink reference signals and the transmission channel with respect to the large-scale channel parameter or the group of large-scale channel parameters as well as the large-scale channel parameter of the L downlink reference signals.

4. The method according to claim 3, wherein the configuration information comprises group information obtained after the first transmission resources are grouped in accordance with a predetermined grouping standard, and the predetermined grouping standard comprises grouping the transmission resources for the downlink reference signals with a same large-scale channel parameter into one group, or grouping the transmission resources received via a same reception beam into one group, or grouping the transmission resources having a same channel transmission requirement into one group, wherein the determining, by the terminal side device, the large-scale channel parameter of the K downlink reference signals transmitted via the first transmission resources in accordance with the configuration information about the first transmission resources comprises: determining the large-scale channel parameter of each group of transmission resources in the first transmission resources in accordance with the group information.

5. The method according to claim 1, wherein the indication information comprises information about indexes of the second transmission resources in the first transmission resources.

6. The method according to claim 1, wherein the measurement results of the third transmission resources are ranked in a descending order to obtain a rank list.

7. The method according to claim 6, wherein transmission resources for the downlink reference signals corresponding to previous K measurement results in the rank list are determined as the first transmission resources.

8. A terminal side device, comprising a processor, a memory, and a computer program stored in the memory and executed by the processor, wherein the processor is configured to execute the computer program so as to implement a method for determining a large-scale channel parameter, the method comprising:

obtaining configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer;

obtaining indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and determining the large-scale channel parameter of the transmission channel in accordance with the indication information and the configuration information about the first transmission resources, wherein the terminal side device obtains third transmission resources transmitted by the base station, wherein the third transmission resources are transmission resources for N downlink reference signals, where N is greater than or equal to K;

wherein the first transmission resources are determined from the third transmission resources.

9. The terminal side device according to claim 8, wherein subsequent to determining the large-scale channel parameter of the transmission channel in accordance with the indication information and the configuration information about the first transmission resources, the method further comprises: determining a reception beam for the transmission channel in accordance with the large-scale parameter of the transmission channel.

10. The terminal side device according to claim 8, wherein the determining the large-scale channel parameter of the transmission channel in accordance with the indication information and the configuration information about the first transmission resource comprises: measuring the K downlink reference signals transmitted via the first transmission resources in accordance with the configuration information about the first transmission resources, determining large-scale channel parameters of the K downlink reference signals transmitted via the first transmission resources; obtaining large-scale channel parameters of the L downlink reference signals in the K downlink reference signals in accordance with information about indexes of the second transmission resources in the first transmission resources and the large-scale channel parameters of the K downlink reference signals; and
    determining the large-scale channel parameter of the transmission channel in accordance with relevant information about the L downlink reference signals and the transmission channel with respect to the large-scale channel parameter or the group of large-scale channel parameters as well as the large-scale channel parameter of the L downlink reference signals.

11. The terminal side device according to claim 10, wherein the configuration information comprises group information obtained after the first transmission resources are grouped in accordance with a predetermined grouping standard, and the predetermined grouping standard comprises grouping the transmission resources for the downlink reference signals with a same large-scale channel parameter into one group, or grouping the transmission resources received via a same reception beam into one group, or grouping the transmission resources having a same channel transmission requirement into one group, wherein the determining, by the terminal side device, the large-scale channel parameter of the K downlink reference signals transmitted via the first transmission resources in accordance with the configuration information about the first transmission resources comprises: determining the large-scale channel parameter of each group of transmission resources in the first transmission resources in accordance with the group information.

12. The terminal side device according to claim 8, wherein the indication information comprises information about indexes of the second transmission resources in the first transmission resources.

13. The terminal side device according to claim 8, wherein the measurement results of the third transmission resources are ranked in a descending order to obtain a rank list.

14. The terminal side device according to claim 13, wherein transmission resources for the downlink reference signals corresponding to previous K measurement results in the rank list are determined as the first transmission resources.

15. A non-transitory computer-readable storage medium storing therein a computer program, wherein the computer program is executed by a processor of a terminal side device, so as to implement a method for determining a large-scale channel parameter, the method comprising:
    obtaining, by the terminal side device, configuration information about first transmission resources transmitted by a base station via first signaling, the first transmission resources being transmission resources for K downlink reference signals, the first transmission resources being related to a transmission channel for a large-scale channel parameter or a group of large-scale channel parameters, K being a positive integer;
    obtaining, by the terminal side device, indication information about second transmission resources transmitted by the base station via second signaling, the second transmission resources being transmission resources selected by the base station from the first transmission resources in accordance with a transmission parameter used by the transmission channel, the second transmission resources being transmission resources for L downlink reference signals, L being a positive integer, and K being greater than or equal to L; and
    determining, by the terminal side device, the large-scale channel parameter of the transmission channel in accordance with the indication information and the configuration information about the first transmission resources,
    wherein the terminal side device obtains third transmission resources transmitted by the base station,
    wherein the third transmission resources are transmission resources for N downlink reference signals, where N is greater than or equal to K;
    wherein the first transmission resources are determined from the third transmission resources.

16. The non-transitory computer-readable storage medium according to claim 15, wherein subsequent to determining, by the terminal side device, the large-scale channel parameter of the transmission channel in accordance with the indication information and the configuration information about the first transmission resources, the method further comprises: determining a reception beam for the transmission channel in accordance with the large-scale parameter of the transmission channel.

17. The non-transitory computer-readable storage medium according to claim 15, wherein the determining, by the terminal side device, the large-scale channel parameter of the transmission channel in accordance with the indication information and the configuration information about the first transmission resource comprises: measuring the K downlink reference signals transmitted via the first transmission resources in accordance with the configuration information about the first transmission resources, determining large-scale channel parameters of the K downlink reference signals transmitted via the first transmission resources; obtaining large-scale channel parameters of the L downlink reference signals in the K downlink reference signals in accordance with information about indexes of the second transmission resources in the first transmission resources and the large-scale channel parameters of the K downlink reference signals; and determining the large-scale channel parameter of the transmission channel in accordance with relevant information about the L downlink reference signals and the transmission channel with respect to the large-scale channel parameter or the group of large-scale channel parameters as well as the large-scale channel parameter of the L downlink reference signals.

18. The non-transitory computer-readable storage medium according to claim 17, wherein the configuration information comprises group information obtained after the first transmission resources are grouped in accordance with a predetermined grouping standard, and the predetermined grouping standard comprises grouping the transmission resources for the downlink reference signals with a same large-scale channel parameter into one group, or grouping the transmission resources received via a same reception beam into one group, or grouping the transmission resources having a same channel transmission requirement into one group, wherein the determining, by the terminal side device, the large-scale channel parameter of the K downlink reference signals transmitted via the first transmission resources in accordance with the configuration information about the first transmission resources comprises: determining the large-scale channel parameter of each group of transmission resources in the first transmission resources in accordance with the group information.

19. The non-transitory computer-readable storage medium according to claim 15, wherein the indication information comprises information about indexes of the second transmission resources in the first transmission resources.

20. The non-transitory computer-readable storage medium according to claim 15, wherein the measurement results of the third transmission resources are ranked in a descending order to obtain a rank list;
wherein transmission resources for the downlink reference signals corresponding to previous K measurement results in the rank list are determined as the first transmission resources.

* * * * *